Dec. 2, 1969    M. KOLODNEY ET AL    3,481,855
CONTINUOUS OXYGEN MONITOR FOR LIQUID METALS
Filed July 15, 1966    2 Sheets-Sheet 1

INVENTORS
MORRIS KOLODNEY
BERTRAM MINUSHKIN
DONALD M. ROSH

BY Pennie, Edmonds, Morton, Taylor & Adams

ATTORNEYS

United States Patent Office 3,481,855
Patented Dec. 2, 1969

3,481,855
CONTINUOUS OXYGEN MONITOR
FOR LIQUID METALS
Morris Kolodney, River Edge, N.J., and Bertram Minushkin, Pearl River, and Donald M. Rosh, Briarcliff Manor, N.Y., assignors to United Nuclear Corporation, Elmsford, N.Y., a corporation of Delaware
Filed July 15, 1966, Ser. No. 565,419
Int. Cl. B01k 3/00
U.S. Cl. 204—195                                   13 Claims

ABSTRACT OF THE DISCLOSURE

Apparatus for monitoring the oxygen content of an oxygen-containing liquid alkali metal comprises an elongated ceramic tube made from a metallic oxide that conducts electricity predominantly by the migration of oxygen ions through the oxide (e.g., $ThO_2$ containing some CaO), the outer surface being in contact with the oxygen-containing liquid metal and the inner surface of the tube being in contact with a reference electrode of known oxygen potential (e.g., Cu and CuO). The elongated ceramic tube is contained in a metal housing that provides an annular space between the ceramic tube and the housing through which the liquid metal can be circulated. The housing is configured so that there is a controlled temperature gradient from that part in contact with the liquid metal to that part out of contact with the liquid metal whereby damage to the ceramic tube as a result of thermal shock is avoided. The voltage generated between the liquid metal and the reference electrode is a measure of the oxygen activity of the liquid metal.

Figure 1:
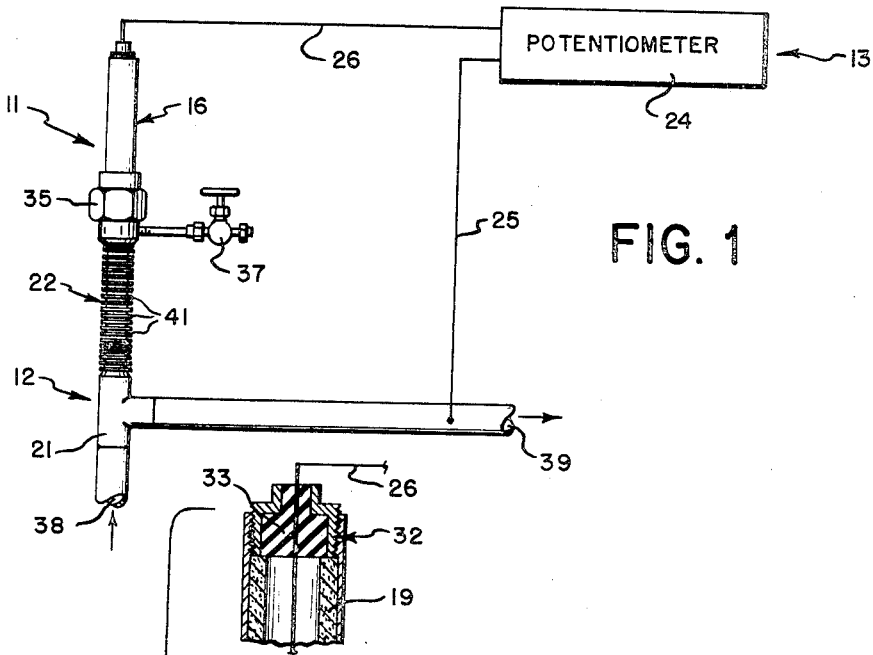

This invention relates to a method and apparatus for continuously monitoring the oxygen content of such liquid metals as liquid sodium, potassium, rubidium, cesium and mixtures of these metals. The invention described herein was made in the course of, or under, a contract with the U.S. Atomic Energy Commission.

The use of liquid metals, and in particular liquid alkali metals, as coolants and as high temperature heat transfer mediums is becoming of increasing importance in nuclear reactors and similar equipment. However, the chemical activity of these metals and their tendency to attack or corrode piping, pumps and other equipment in which the liquid metal circulates present serious problems with respect to the maintenance and service life of this equipment despite the fact that the equipment is fabricated of special corrosion-resistant steels and refractory metals. Moreover, the tendency of the liquid metal to attack or corrode the equipment in which it is contained increases as the oxygen content of liquid alkali metal increases. As a consequence, it is extremely important to maintain the oxygen content of liquid metal as low as possible (in the order of about 5 to 25 parts per million depending on the nature of the container material) in order to avoid excessive corrosion of the equipment employed in high temperature liquid metal systems.

In order to insure proper functioning of the liquid metal purification equipment and the safety of the overall system in which the liquid metal is employed it is necessary to provide some means for monitoring or measuring the oxygen content of the liquid metal. The oxygen content of liquid alkali metals has heretofore been monitored or measured by such techniques as sampling and chemical analysis, by plugging meters and by resistivity meters which measure the electrical resistivity of the liquid metal. However, these techniques have not proven to be satisfactory in that they are not continuous and require elaborate sampling and analytical procedures which introduce potential errors and significant delays in availability of the results, in that they are generally not useful at the low oxygen levels which are required or in that they are non-selective and cannot differentiate between oxygen and other impurities in the liquid metal.

To overcome the limitations of the aforementioned procedures it has been proposed that the oxygen content of liquid alkali metals be continuously monitored by an electrolytic technique which, in effect, measures the electromotive force generated by a galvanic cell one electrode of which is the oxygen-containing liquid metal, the other electrode (the reference electrode) of which is a metal oxide or oxygen-containing metal having a known oxygen potential that is stable under the conditions encountered in the operation of the device, and the electrolyte of which is a solid metallic oxide that conducts electricity predominately by the transfer or migration of oxygen ions therethrough. The voltage or potential difference that exists between the reference electrode of known oxygen potential and the liquid metal electrode of unknown oxygen potential is dependent upon the difference in the oxygen potential or activity of the two electrodes of the cell. The voltage generated by the cell is, therefore, a direct measure of the oxygen activity of the liquid metal and is related to the concentration of oxygen in the liquid metal. Continuous measurement of the voltage generated by this galvanic cell provides a continuous indication of the oxygen content of the liquid metal. This electrolytic technique can, therefore, be employed to continuously monitor the oxygen content of liquid metals. Moreover, the technique possesses important advantages over other known oxygen monitoring procedures in that it is specific and responds only to changes in the oxygen content of the liquid metal and in that it is useful at the lowest oxygen content attainable and, in fact, increases in sensitivity as the oxygen content of the liquid metal decreases.

Apparatus embodying the aforementioned electrolytic technique have heretofore been devised for continuously monitoring the oxygen content of liquid alkali metals. However, these prior devices have not been entirely satisfactory due to the practical difficulties encountered in providing a rugged and reliable instrument that can withstand the severe service conditions encountered in use. For example, the oxygen ion-conducting electrolyte must be fabricated from a metallic oxide material that is substantially impervious to gases and to the oxygen-containing liquid metal, and it must have sufficient mechanical strength and resistance to thermal shock (either inherently or as a result of the design of the instrument) to withstand the high temperatures and other stresses to which it is subjected in practice. Moreover, it is important that the reference electrode of the device have a predictable and extremely stable oxygen activity, and further that the oxygen content of the atmosphere or other enivronment in contact with the reference electrode be substantially free of oxygen so that the oxygen activity of the reference electrode will not be affected thereby. These requirements, and other difficulties encountered in the construction of a practical oxygen meter embodying the aforementioned electrolytic technique, have up to now precluded wide use of such a meter.

As a result of an intensive investigation of the problems heretofore encountered in the construction of a rugged and reliable oxygen meter for liquid metals, we have now devised an improved oxygen meter or apparatus, and an improved method, for continuously monitoring the oxygen content of liquid alkali metals which embodies the aforementioned electrolytic technique and which overcomes the practical difficulties heretofore encountered. Our new apparatus, which possesses structural features that insure reliable operation, accuracy and a long service life over a wider range of temperatures than heretofore possible, comprises in its major components a solid electrolyte made of a metallic oxide material that conducts electricity predominately by the transfer of oxygen ions, a reference electrode having a stable oxygen potential in intimate physical contact with the inner surface of the solid electrolyte, a metal cap secured to the solid electrolyte by a gas-tight seal, an electric lead for the reference electrode, a housing for the solid electrolyte adapted to permit the liquid metal the oxygen content of which is being monitored to circulate in contact with the outer surface of the solid electrolyte, and potentiometer means provided with electrical connector means for electrically connecting it to the liquid metal the oxygen content of which is being monitored and to the reference electrode in contact with the inner surface of the solid electrolyte whereby the potential difference between the liquid metal and the reference electrode may be continuously measured.

Specifically, the preferred embodiment of our new apparatus comprises an elongated ceramic tube having a closed bottom end and an open upper end, the tube being formed of a metallic oxide material that is impervious to gases and to the liquid metal the oxygen content of which is being monitored and that has a crystal structure containing oxygen ion vacancies whereby the metallic oxide material conducts electricity predominately by the migration of oxygen ions through the material. A reference electrode comprising an oxygen-containing material that is stable at the operating temperature of the apparatus and the free energy of formation of the oxidic constituent of which is known is disposed in intimate physical and electrical contact with the inner surface at the closed bottom and of the ceramic tube. The reference electrode advantageously comprises a mixture of copper and copper oxide, nickel and nickel oxide, iron and iron oxide and cobalt and cobalt oxide, the metal and metal oxide mixture advantageously being compacted and sintered in place at the bottom of the tube. Alternatively, the reference electrode may comprise an oxygen-bearing gas in contact with a suitable coating such as platinum on the inner surface of the ceramic tube. The upper end of the ceramic tube is secured to the lower end of a metal cap member by hermetic seal means that is resistant to attack by alkali metals at the operating temperature of the apparatus, the interior space of the cap member communicating with the interior space of the ceramic tube. When the reference electrode comprises a mixture of a metal and its oxide, and under certain circumstances when the reference electrode comprises an oxygen-bearing gas, a deoxidizing material capable of removing substantially all of the oxygen from the gaseous atmosphere within the cap member and the ceramic tube at the operating temperature of the apparatus is conveniently disposed within the cap member. An electrical conductor extends from the reference electrode through the closed upper end of the cap member, the electrical conductor being provided with insulation such that the current leakage therethrough is substantially less than the current used by a voltage measuring instrument to which the apparatus is adapted to be connected.

The ceramic tube is received in a metal housing the inner surface of which is generally parallel to and spaced slightly apart from the outer surface of the tube. The housing is approximately of the same length as the tube, the upper end of the housing being secured to the lower end of the cap member and the lower end of the housing being provided with a liquid metal inlet opening and a liquid metal outlet opening whereby liquid metal the oxygen content of which is being monitored may be circulated through the lower portion of the housing in contact with the bottom end of the tube. The liquid metal also may enter and rise upwardly in the annular space defined by the outer surface of the ceramic tube and the inner surface of the housing. Cooling means are disposed on the outer surface of the housing between the upper and lower ends thereof whereby liquid metal entering the generally annular space defined by the outer surface of the ceramic tube and the inner surface of the housing member is cooled from the operating temperature of the liquid metal system adjacent the lower end of the housing gradually to a substantially lower temperature adjacent the upper end of the housing and the ceramic tube contained therein.

Figure 2:
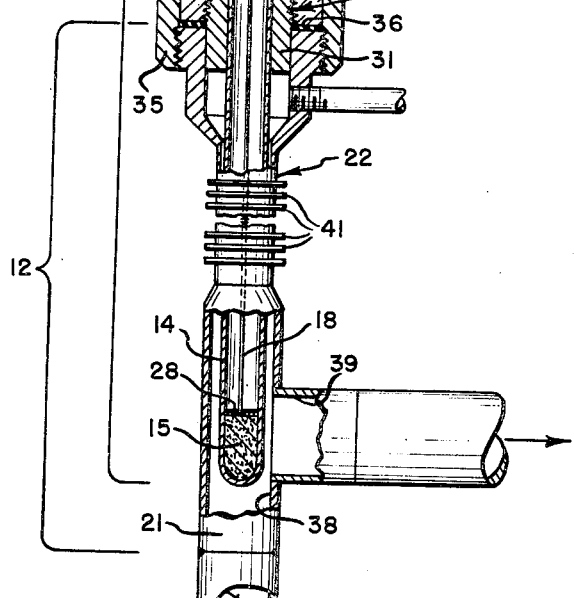
Figure 3:
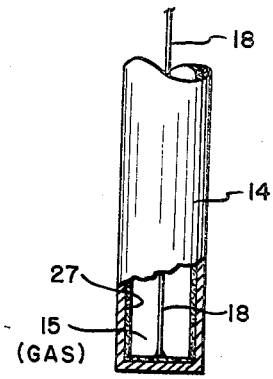
Figure 4:
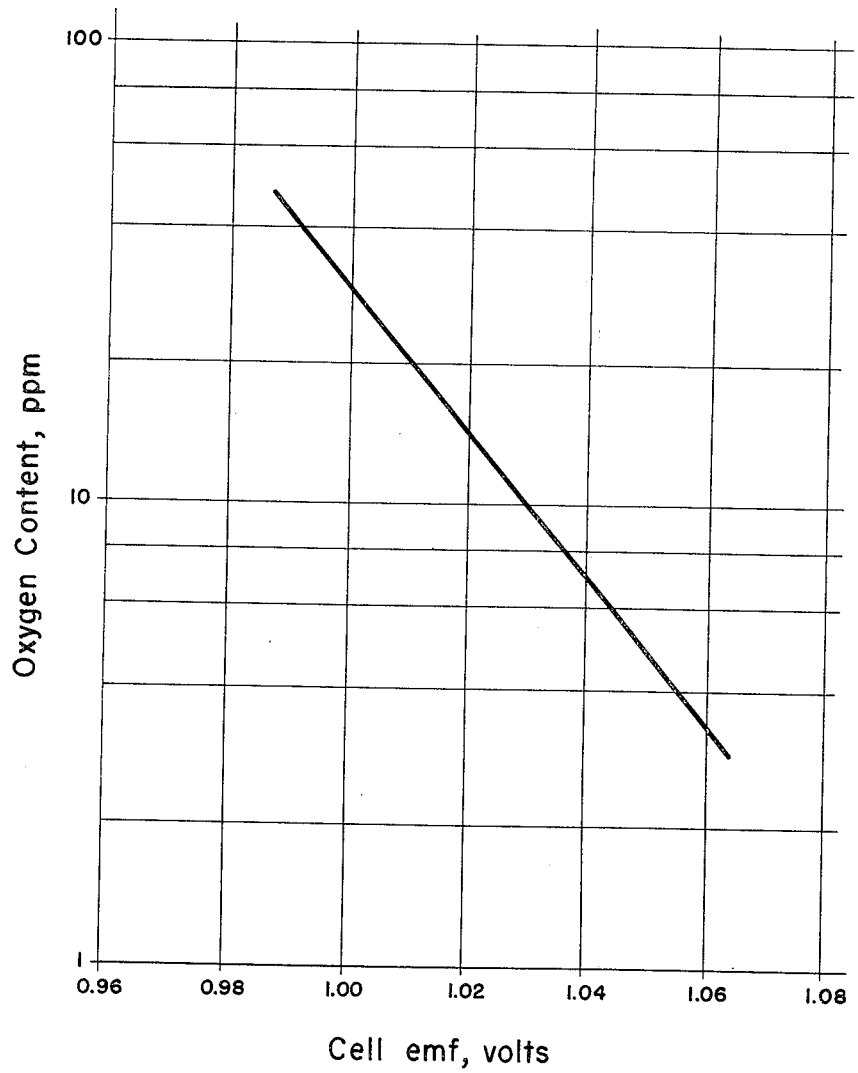

Other features and advantages of the oxygen monitoring method and apparatus of our invention will be better understood from the following description thereof, in conjunction with the accompanying drawings of which:

FIG. 1 is an overall schematic view of the preferred embodiment of the oxygen monitoring apparatus of our invention, FIG. 2 is an enlarged sectional view of the improved electrode assembly of our invention, FIG. 3 is a fragmentary view partly in section of a modified form of the solid electrolyte, and FIG. 4 is a graph showing the relationship between the oxygen content of liquid metal in contact with the electrolyte of our apparatus and the voltage generated as a result of the difference in the oxygen potential of the liquid metal and the reference electrode of the apparatus.

As previously pointed out, the oxygen content of liquid alkali metals can be determined and monitored by continuously measuring with potentiometer means of low current drain the voltage generated by a galvanic cell one electrode of which is the oxygen-containing liquid metal, the other or reference electrode of which is a material having a known oxygen potential, and the electrolyte of which is a solid metallic oxide that conducts electricity predominately by the transfer or migration of oxygen ions therethrough. Oxygen monitoring instruments embodying this electrolytic technique possess unique and important advantages over other known oxygen monitoring devices in that they respond only to changes in the oxygen content of the liquid metal and in that they are useful at the lowest oxygen content attainable and, in fact, increase in sensitivity as the oxygen content of the liquid metal decreases.

The oxygen monitoring apparatus of our invention is an improved practical embodiment of the aforementioned electrolytic technique. As shown in FIGS. 1 and 2, the preferred embodiment of our improved oxygen monitoring apparatus comprises, in its major components, an electrode assembly 11, a housing member 12 and essentially conventional voltage measuring means 13. The electrode assembly 11 comprises a solid electrolyte that is in the form of a ceramic tube 14 made of an oxidic material that conducts electricity predominately by the transfer of oxygen ions, a reference electrode 15 that is made of an oxygen-containing material having a stable oxygen potential and that is disposed in intimate physical contact with the inner surface of the closed bottom end of the ceramic tube 14, a gas tight cap member 16 secured to the upper end of the ceramic tube 14 by hermetic seal means 17 that is resistant to attack by alkali metals, and an electric lead 18 for the reference electrode 15 that extends through the upper end of the gas-tight cap member 16. The interior space of the gas-tight cap member 16 communicates with the interior space of the ceramic tube 14, and a deoxidizer material 19 is usually disposed within this interior space, usually within the gas-tight cap member, to maintain the atmosphere within the cap member and the ceramic tube substantially free of oxygen as hereinafter more fully described. The housing member 12 comprises a lower housing section 21 in which the lower end of the ceramic tube 14 is received, the housing section 21 being adapted to permit the liquid metal the oxygen content of which is being monitored to circulate in contact with the outer surface of the closed bottom end of the tube, and a cooling section 22 in which the center portion of the ceramic tube 14 is received, the cooling section 22 being adapted to gradually cool the liquid metal contained therein so as to prevent damage to the ceramic tube 14 as hereinafter more fully described. The essentially conventional voltage measuring means 13 comprises potentiometer means 24 and electrical connector means 25 and 26 for electrically connecting the potentiometer to the liquid metal electrode in contact with the outer surface of the ceramic tube 14 and to the reference electrode 15 in contact with the inner surface of the ceramic tube whereby the potential difference between the liquid metal electrode and the reference electrode may be continuously measured.

The solid electrolyte employed in the apparatus of our invention is a metallic oxide material that has a crystal structure containing oxygen ion vacancies such that the material conducts electricity predominantly by the migration or transfer of oxygen ions through the crystalline structure of the material. Metallic oxide materials which possess the required electrical properties include, but are not limited to, solid solutions of such solvent metal oxides as thoria ($ThO_2$), zirconia ($ZrO_2$), hafnia ($HfO_2$) and ceria ($CeO_2$) and crystal lattice of which solvent metal oxide contains from about 2 to 20% by weight, and preferably from about 2 to 15% by weight, of a solute metal oxide the metallic constituent of which has a valance of less than four. Solute metal oxides which have been successfully employed for this purpose include, but are not limited to, calcia (CaO), strontia (SrO), yttria ($Y_2O_3$), lanthana ($La_2O_3$) and the rare earth metal oxides the metallic constituent of which have a valence of less than four. We presently prefer to use thoria containing from about 10 to 15% by weight yttria or from about 4 to 8% by weight calcia, or zirconia containing like amounts of yttria or calcia. The metallic oxide material is formed by conventional ceramic processes into an elongated ceramic tube 14 having a dense, rigid and relatively strong ceramic structure that is impervious both to gases and to liquid metals at the operating temperature of the apparatus, the tube 14 being open at its upper end and having a closed bottom end advantageously having a generally hemispherical configuration as shown in FIG. 2. Alternatively, the tube 14 may be a cylindrical structure having a flat bottom end as shown in FIG. 3, or it may have various other configurations.

The crystal lattice of the metallic oxide material must have oxygen ion vacancies in order for the solid electrolyte to conduct electricity by the transfer or migration of oxygen ions therethrough. However, some of the normally unoccupied vacancies in the crystal lattice may contain oxygen inadvertently introduced into the crystal structure during the firing of the ceramic tube. Accordingly, after firing, the ceramic tube 14 is advantageously heated in a reducing envirnoment for a sufficient length of time to insure that substantially all of the excess oxygen is removed from the crystal structure of the metallic oxide material, thereby allowing the oxide to attain a substantially stoichiometric composition. For example, if the ceramic tube 14 has been fabricated of thoria containing 15% by weight yttria, the tube is advantageously placed on an alumina support inside a furnace muffle. Graphite is placed in the furnace muffle surrounding but not touching the ceramic tube. The furnace muffle is then sealed, evacuated and filled with purified argon, whereupon the furnace and its contents are heated to a temperature of about 1200° F. for a period of about 72 hours. Under these conditions the oxygen potential of the furnace atmosphere is very low and any excess oxygen present is removed from the ceramic tube. Other reducing atmospheres may, of course, be used to accomplish this purpose.

The reference electrode 15 is formed of an oxygen-containing material that is physically and chemically stable at the operating temperature of the apparatus and for which the free energy of formation of the oxidic constituent thereof is known. Oxygen-containing materials from which the reference electrode is formed advantageously are intimate mixtures of a metal and its oxide or are oxygen bearing gases of known oxygen potential. Metal and metal oxide mixtures of known oxygen potential which may be used as the reference electrode include, but are not limited to, copper and cuprous oxide, nickel and nickel oxide, iron and iron oxide and cobalt and cobalt oxide. Oxygen-bearing gases of known oxygen potential which may be used as the reference electrode include, but are not limited to, mixtures of carbon monoxide and carbon dioxide, mixtures of an inert gas (for example, argon or nitrogen) and oxygen, and the like. It is essential that the reference electrode 15 be in good electrical contact with the inside of the ceramic tube 14 and be capable of maintaining a fixed oxygen potential at the inside surface of the tube. Accordingly, in the case of a reference electrode formed from a metal and its oxide, a small quantity of the metal-metal oxide powder mixture is rubbed or burnished on the inside surface of the closed bottom end of the ceramic tube 14, and then the remainder of the mixture is compacted in place at the bottom of the tube. The compacted metal-metal oxide mixture is then advantageously heated to partially sinter the metal powder and thereby form a solid reference electrode 15 that has a stable and predictable oxygen potential. In the case of a reference electrode formed from an oxygen-bearing gas, the inner surface of the ceramic tube 14 is provided with a porous layer 27 of a metal such as platinum, gold or silver in which oxygen will dissolve but with which it will not react, as shown in FIG. 3.

By way of example, a reference electrode composed of copper and cuprous oxide useful in the practice of our invention is prepared as follows: Equal volumes of reagent grade electrolytic copper and cuprous oxide powders are mixed in a ball mill under an argon blanket to obtain an intimate and very finely divided mixture of copper and cuprous oxide powder. A small amount of the copper powder, or the mixture of copper and cuprous oxide powder, is then burnished onto the inside surface of the bottom of the ceramic tube 14 to insure intimate physical and electrical contact therewith. About 2½ grams of the mixture of copper and cuprous oxide powder is then placed at the bottom of the ceramic tube 14 and is compacted in place by conventional vibratory compaction to obtain about a 25% increase in apparent density. Copper disks 28 are then placed in the tube 14 over the compacted mixture of copper and cuprous oxide powder to hold the powder in place and to provide electrical contact with the upper surface of the reference electrode 15. Although the powder mixture will operate satisfactorily in generating a voltage, it may sinter partially in use thereby breaking connection with the inner surface of the ceramic electrolyte. In addition, a powder is more difficult to handle during shipping. Therefore, the mixture of copper and cuprous oxide powder may be advantageously partially sintered to form a solid pellet which conforms closely to the internal contours of the ceramic tube 14 either before or after the ceramic tube is secured to the cap member 16 as hereinafter described.

The upper end of the ceramic tube 14 is connected to the lower end of the generally cylindrical elongated cap member 16 by hermetic seal means 17 that is not only gas-tight but is resistant to attack by liquid or solid alkali metals at the operating temperature of the apparatus. Such a hermetic seal may be formed by a metal-to-ceramic joint, by a packed gland, by a mechanical joint having lapped surfaces, or by a joint utilizing a heat and alkali metal resistant elastomer material. In the embodiment of the apparatus shown in the drawing the hermetic seal means comprises an O-ring 30 formed of a silicone-based elastomer material, the O-ring 30 being forced into gas-tight contact with the outer surface of ceramic tube 14 and the inner surface of the cap member 16 by means of the support and centering sleeve 31.

The upper end of the cap member 16 is provided with a gas-tight seal member 32, and the electric lead 18, which is connected to the reference electrode 15 by means of the porous metal layer 27 or the metal disks 28, extends through the seal member 32 at the upper end of the cap member 16. The electric lead 18 is provided with insulation means 33 such that the current leakage therethrough is substantially less than the current used by the potentiometer means 24 to which the electrode 15 and the oxygen-containing liquid metal are electrically connected. For example, if the potentiometer means 24 draws about $10^{-8}$ ampere, the insulation means 33 has an effective dielectric strength such that the current leakage between the conductor 18 and ground is advantageously less than $10^{-9}$ ampere.

The interior of the cap member 16 communicates with the interior of the ceramic tube 14, and this interior space is sealed from the external atmosphere by the hermetic seal means 17 and the gas-tight seal member 32. In the case when the reference electrode 15 is a mixture of a metal and its oxide the interior space is filled with an inert gas such as helium or argon, and we have found that unless this inert gas has a very low initial oxygen content and is protected against subsequent oxygen contamination the reference electrode 15 will produce erroneous voltages. Accordingly, a deoxidizing material 19 (referred to in the art as a "getter") which is capable of removing oxygen from the inert gas at the operating temperature of the apparatus is disposed within the cap member 16 as shown in FIG. 2, or, if desired, within the ceramic tube 14 on top of the reference electrode 15. Deoxidizing or getter materials useful for this purpose include, but are not limited to, activated copper (that is copper that has been reduced in situ from copper oxide), alkali metals, alkaline earth metals and reactive refractory metals. In the case when the reference electrode 15 is an oxygen-bearing gas the use of a deoxidizing or getter material within the cap member 16 and the ceramic tube 14 will depend on the nature of the gas electrode and the desired concentration of free oxygen therein. That is to say, a getter would not ordinarily be used if it is desired that the gaseous reference electrode contain a relatively high concentration of oxygen (say, one percent or more oxygen) whereas a getter might be used if it is desired that the gaseous reference electrode contain a relatively low concentration of oxygen (say, a few p.p.m. or less of oxygen).

The ceramic tube 14, the reference electrode 15, the cap member 16, the hermetic seal means 17 by which the upper end of the ceramic tube is secured to the lower end of the cap member, the electric lead 18, the deoxidizing material 19 and the gas-tight seal member 32 through which the electric lead 18 extends comprise the electrode assembly 11. If the reference electrode 15 is formed of a mixture of metal and metal oxide powder which has not previously been partially sintered to form a solid pellet, the electrode assembly 11 is placed in a suitable furnace and heated for about 48 hours at a temperature of from about 700 to 150° F. in an argon atmosphere of very low oxygen activity. As a result of this treatment, the mixture of metal and metal oxide powder which comprises the reference electrode is partially sintered to form a pellet which conforms closely to the internal contours of the ceramic tube 14.

The ceramic tube 14 of the electrode assembly 11 is received in an elongated generally cylindrical housing member 12 the upper end of which is secured to the lower end of the cap member 16 by means of a coupling nut 35 provided with a gas-tight gasket 36 as shown in FIG. 2. The housing member 12 is approximately the same length as the ceramic tube 14 and has a generally cylindrical configuration the inner surface of which is generally parallel to and spaced slightly apart from the outer surface of the ceramic tube, the outer surface of the ceramic tube 14 and the inner surface of the housing member 12 defining an annular space in which liquid metal may enter. The housing member 12 comprises a lower housing section 21 and a cooling section 22, and it is provided with valve means 37 for evacuating and purging the interior of the housing member with an inert gas. The lower housing section 21 is provided with liquid metal inlet opening 38 and with liquid metal outlet opening 39 which allow liquid metal the oxygen content of which is being monitored to circulate through the lower housing section in contact with the bottom end of the ceramic tube 14. The cooling section 22 is provided with cooling means disposed on the outer surface thereof, the cooling means advantageously comprising a plurality of closely spaced annular fins 41 as shown clearly in FIGS. 1 and 2 of the drawing. Liquid metal entering the generally annular space defined by the outer surface of the ceramic tube 14 and the inner surface of the cooling section 22 of the housing member 12 is cooled gradually from the operating temperature of the liquid metal system adjacent the lower end of the cooling section to a substantially lower temperature adjacent the upper end of the cooling section so that there is a gradual temperature gradient from said lower end to said upper end which substantially reduces the likelihood of thermal shock and breakage of the ceramic tube.

The housing member 12 is installed directly in the piping of the liquid metal system and liquid metal flows through the lower housing section 21 thereof as indicated by the arrows in FIGS. 1 and 2 of the drawing. When the ceramic tube 14 of the electrode assembly 11 is inserted in the housing member 12 as shown in FIG. 2, liquid metal flows through the lower housing section 21 in contact with the outer surface of the ceramic tube 14 and also rises upwardly in the annular space between the outer surface of the ceramic tube and the inner surface of the cooling section 22 of the housing member. As noted, the cooling effect of the external fins 41 reduces the temperature of the liquid metal in the cooling section 22 from, typically, about 600° F. adjacent the lower end of the cooling section to, typically, about 150° F. adjacent the upper end of the cooling section, this gradual temperature reduction along the length of the ceramic tube protecting it from thermal and mechanical shock. Moreover, if the temperature of the liquid metal in the upper portion of the annular space is reduced to below its melting point, the metal will freeze and thereby form a secondary seal within the annulus.

As the liquid metal flows through the lower end of the housing member 12 in contact with the lower end of the ceramic tube 14 a voltage is generated between the liquid metal and the reference electrode 15. This voltage is measured by potentiometer means 24 that limits the current drain advantageously to less than $10^{-8}$ ampere (depending on the temperature) and that is capable of measuring the potential difference with an accuracy of ± one millivolt. The relationship between the voltage or emf generated by the galvanic cell and the concentration of oxygen in the liquid metal for a typical oxygen monitoring apparatus of our invention is shown in FIG. 4 of the drawing. It is clear from FIG. 4 that the oxygen monitoring apparatus is not only capable of measuring the oxygen content of liquid metal at much lower concentrations than heretofore possible but also that the sensitivity of the apparatus increases as the oxygen content of the liquid metal decreases. For example, when sodium at 600° F. containing 40 parts per million (p.p.m.) of oxygen flows through the housing member 12 in contact with the ceramic tube 14, a potential difference of 0.992 volt is measured by the potentiometer 24. If the sodium is purified by a known method to reduce the oxygen content thereof to 10 p.p.m., the voltage of the galvanic cell as measured by the potentiometer 24 rises to 1.030 volts, and if the sodium is further purified so that it contains 4 p.p.m. of oxygen, the voltage rises to a value of 1.056 volts. The increase of 0.026 volt for a 2.5 fold decrease in oxygen content from 10 p.p.m. to 4 p.p.m. is easily measured, and a similar decrease from 4 p.p.m. to 1.6 p.p.m. produces a similar 0.026 volt increase in the emf of the cell. Consequently, the sensitivity of the instrument greatly exceeds all of the previous methods of monitoring the oxygen content of liquid metals.

The precautions observed to maintain the oxygen potential of the atmosphere within the electrode assembly of our apparatus at a known and stable value and to protect the solid ceramic electrolyte against thermal and mechanical shock make it possible to use the method and apparatus of our invention over a substantially wider range of temperatures than heretofore possible with prior art devices of this type. For example, the lowest temperature at which one well known prior art device can usefully be employed is about 750° F., whereas the method and apparatus of our invention can successfully be to monitor the oxygen content of liquid metals at temperatures as low as 400° to 450° F. Accordingly, from the foregoing description of our improved apparatus and method for monitoring the oxygen content of liquid metals it will be seen that we have made an important contribution to the art to which our invention relates.

We claim:

1. Apparatus for continuously monitoring the oxygen content of an oxygen-containing liquid alkali metal which comprises,
    an elongated ceramic tube having a closed bottom end and an open upper end, the tube being formed of a metallic oxide material that is impervious to gases and to the liquid metal the oxygen content of which is being monitored, said metallic oxide having a crystal structure containing oxygen ion vacancies whereby the metallic oxide material conducts electricity predominantly by the migration of oxygen ions through the material,
    a reference electrode in intimate physical contact with the inner surface of the closed bottom of the ceramic tube, the reference electrode comprising an oxygen-containing material that is physically and chemically stable at the operating temperature of the apparatus and the free energy of formation of the oxidic constituent of which is known,
    a metal cap member the upper end of which is closed and the lower end of which is secured to the upper end of the ceramic tube by hermetic seal means that is gas-tight and is resistant to attack by alkali metals at the operating temperature of the apparatus, the interior space of cap member communicating with the interior space of the ceramic tube,
    an electrical conductor extending from the reference electrode through the closed upper end of the cap member, the electrical conductor being provided with insulation such that the current leakage therethrough is substantially less than the current used by a voltage measuring instrument to which the apparatus is adapted to be connected,
    a metal housing for the ceramic tube the inner surface of which is generally parallel to and spaced slightly apart from the outer surface of the tube, the upper end of the housing being approximately of the same length as the tube, the upper end of the housing being secured to the lower end of the cap member, and the lower end of the housing being provided with a liquid metal inlet opening and a liquid metal outlet opening whereby liquid metal the oxygen content of which is being monitored may be circulated through the lower portion of the housing in contact with the bottom end of the tube, and
    cooling means disposed on the outer surface of the housing between the upper and lower ends thereof whereby liquid metal entering the generally annular space defined by the outer surface of the ceramic tube and the inner surface of the housing is cooled from the operating temperature of the liquid metal system adjacent the lower end of the housing gradually to a substantially lower temperature adjacent the upper end of the housing and the ceramic tube therein.

2. Apparatus according to claim 1 in which said electrical conductor and said liquid alkali metal are electrically connected to a voltage measuring instrument.

3. Apparatus according to claim 2 in which the voltage measuring instrument uses less than about $10^{-8}$ ampere and in which the electrical conductor is provided with insulation the current leakage through which is less than about $10^{-9}$ ampere.

4. Apparatus according to claim 1 in which the metallic oxide material of the ceramic tube is a solid solution of a solvent metal oxide and from about 2 to 20% by weight of a solute metal oxide, the solvent metal oxide being selected from the group consisting of thoris, zirconia, hafnia and ceria, and the solute metal oxide being an oxide of a metal having a valence of less than four and which is capable of entering the crystal lattice of the solvent metal oxide.

5. Apparatus according to claim 4 in which the solute metal oxide is selected from the group consisting of calcia, strontia, yttria, lanthana and the rare earth metal oxides the metallic constituent of which has a valence of less than four.

6. Apparatus according to claim 1 in which the metallic oxide material of the ceramic tube is a solid solution of thoria and from about 2 to 15% by weight of a solute metal oxide selected from the group consisting of calcia, yttria and lanthana.

7. Apparatus according to claim 1 in which the ceramic tube is heated in a reducing environment for sufficient time for the metallic oxide constituent of the tube to attain a substantially stiochiometric composition.

8. Apparatus according to claim 7 in which the substantially stiochiometric composition of the metallic oxide is obtained by heating the ceramic tube in an essentially inert atmosphere in close proximity to graphite at a temperature of about 1200° F.

9. Apparatus according to claim 1 in which the reference electrode comprises an intimate mixture of a metal and its oxide selected from the group consisting of copper and cuprious oxide, nickel and nickel oxide, iron and iron oxide and cobalt and cobalt oxide.

10. Apparatus according to claim 9 in which the inner surface of the bottom end of the ceramic tube is burnished with said mixture of a metal and its oxide.

11. Apparatus according to claim 9 in which said mixture of a metal and its oxide is at least partially sintered in situ at the bottom end of the ceramic tube.

12. Apparatus according to claim 1 in which the inner surface of the bottom end of the ceramic tube is provided with a porous layer of a metal in which oxygen gas will dissolve and with which it will not react, and in which the reference electrode is an oxygen-containing gas.

13. Apparatus according to claim 1 in which the deoxidizing material is selected from the group consisting of activated copper powder, alkali metal, alkaline earth metal, and refractory metal powders.

References Cited

UNITED STATES PATENTS

| | | | |
|---|---|---|---|
| 3,297,551 | 1/1967 | Alcock | 204—1.1 |
| 3,309,233 | 3/1967 | McPheeters et al. | 136—153 |
| 3,347,767 | 10/1067 | Hickam | 204—195 |
| 3,378,478 | 4/1968 | Kolodney et al. | 204—195 |

JOHN H. MACK, Primary Examiner

T. TUNG, Assistant Examiner

U.S. Cl. X.R.

136—86, 153; 204—1

PO-1050
(5/69)

UNITED STATES PATENT OFFICE
CERTIFICATE OF CORRECTION

Patent No. 3,481,855            Dated December 2, 1969

Inventor(s)     Morris Kolodney et al.

It is certified that error appears in the above-identified patent and that said Letters Patent are hereby corrected as shown below:

In column 2, line 56, "enivronment" should read -- environment --. In column 3, line 41, "suitable" should read -- metallic --. In column 5, line 20, "and" should read -- the --; line 23, "valance" should read -- valence --; line 51, "envirnoment" should read -- environment --. In column 7, line 57, "150°" should read -- 750° --. In column 10, line 17, "thoris" should read -- thoria --; line 58, aft "the" insert -- metal cap member contains a --; line 59, aft "material" delete -- is --; line 67, "10/1067" should read -- 10/1967.

SIGNED AND
SEALED

JUN 9 1970

(SEAL)
Attest:

Edward M. Fletcher, Jr.
Attesting Officer

WILLIAM E. SCHUYLER,
Commissioner of Pate